United States Patent [19]

Schauer et al.

[11] 4,251,485
[45] Feb. 17, 1981

[54] APPARATUS FOR CLEANSING NOXIOUS CONSTITUENTS FROM GAS STREAMS

[76] Inventors: John M. Schauer, Lockport; Dennis J. Schauer, Joliet, both of Ill.

[21] Appl. No.: 890,988

[22] Filed: Mar. 28, 1978

Related U.S. Application Data

[63] Continuation-in-part of Ser. No. 732,432, Oct. 14, 1976, abandoned, which is a continuation-in-part of Ser. No. 629,617, Nov. 5, 1975, abandoned.

[51] Int. Cl.$^3$ ............................................. B01D 53/34
[52] U.S. Cl. ..................................... 422/168; 55/248; 55/256; 261/121 R
[58] Field of Search ......... 55/248, 255, 256, DIG. 30; 261/121 R; 422/168

[56] References Cited

U.S. PATENT DOCUMENTS

| | | | |
|---|---|---|---|
| 1,889,137 | 11/1932 | While | 261/121 R |
| 1,939,949 | 12/1933 | Bertram | 261/121 R |
| 2,064,833 | 12/1936 | Howard | 261/121 R |
| 2,389,488 | 11/1945 | Dailey, Jr. | 261/121 R |
| 3,063,683 | 11/1962 | Irvin | 55/256 |

FOREIGN PATENT DOCUMENTS

| | | | |
|---|---|---|---|
| 277943 | 1/1970 | Austria | 261/121 R |
| 844388 | 6/1970 | Canada | 55/95 |
| 566593 | 9/1957 | Italy | 55/256 |

*Primary Examiner*—Bernard Nozick

*Attorney, Agent, or Firm*—Clarence A. O'Brien; Harvey B. Jacobson

[57] ABSTRACT

An apparatus for chemically altering and scrubbing the noxious constituents from foundry core manufacturing and arc welding operations comprising an upstanding closed container with a gas washing liquid disposed within the container to a predetermined level. A horizontal baffle is mounted stationarily within the container at an elevation spaced above the level of the gas washing liquid therein and spaced peripheral portions of the baffle are spaced inwardly of the opposing inner surface of the container. A gas drive pipe extends into the container, downwardly past the baffle, and opens downwardly in a central lower portion of the container, below the baffle and near the bottom of the liquid. The container includes a top cover and an outlet duct is provided which opens outwardly of the container through a central portion of the cover. The gases are pumped into the drive pipe to achieve a critical velocity at the exit of the drive pipe of about 2300–20,000 linear feet per minute.

Entering the liquid in a substantially vertical downward direction within the critical velocity range, small gas-containing bubbles, on the order of $\frac{1}{8}$-$\frac{3}{8}$ inches in diameter, are formed as the gas stream rises, which bubbles impact against the horizontal baffle. The high velocity gases impart sufficient kinetic energy to the system to enable the necessary chemical reactions and scrubbing to proceed.

21 Claims, 7 Drawing Figures

APPARATUS FOR CLEANSING NOXIOUS CONSTITUENTS FROM GAS STREAMS

CROSS-REFERENCE TO ANOTHER APPLICATION

This is a continuation-in-part of Ser. No. 732,432, filed Oct. 14, 1976, now abandoned which is a continuation-in-part of Ser. No. 629,617, filed Nov. 5, 1975, now abandoned.

This invention relates to an apparatus and method for cleaning, scrubbing and deodorizing industrial stack gases, especially where a chemical reaction is desired to remove the toxic and noxious constituent(s), such as the stack gases generated in the making of foundry cores and in arc welding operations.

BACKGROUND OF THE INVENTION

Various industrial manufacturing processes often result in unwanted gaseous by-products that must be disposed of prior to releasing the gases to the environment. For example, foundry cores and molds are cured in the chemical core making or cold box process through the utilization of dimethylethylamine gas (hereafter DMEA) and the gas, after being utilized in the process of curing the foundry core, has previously been exhausted to the atmosphere. Similarly, in the "exothermic" or "hot process" for making conventional foundry cores, exhaust gases having high quantities of noxious gases, such as formaldehyde and phenols, have previously been passed directly into the atmosphere. However, these gases have objectionable odors and contain constituents which have serious detrimental effects on the environment. To the same detrimental effect are the exhaust gases from processes for forming shell sand cores, arc welding operations as well as many other industrial facilities.

Various forms of gas deodorizers and gas washing apparatuses have heretofore been designed, some of which are disclosed in U.S. Pat. Nos. 242,368, 411,014, 1,182,543, 3,183,645, 3,811,249 and 3,895,926. Reference should also be made to the prior art cited in connection with our above-identified parent application, e.g. U.S. Pat. Nos. 1,750,800, 2,250,226, 3,216,181, French Pat. No. 543,412, and Italian Pat. No. 566,593. Moreover, most gas washing and deodorizing apparatus have been designed to perform specific functions in specific operating environments, and are not well suited to perform different functions in other environments, particularly the removal of noxious gases from the exhaust streams from foundry core and shell sand core manufacturing processes, arc welding operations and many other industrial plants.

SUMMARY OF THE INVENTION

This invention broadly relates to a gas cleaning and scrubbing apparatus and method, especially suited for chemically altering and scrubbing the noxious components of stack gases generated in the manufacture of foundry cores and molds, arc welding operations and the like.

More specifically, the gas washing apparatus of the present invention includes an upright container or tank which is partially filled with a gas washing liquid. Spaced above the top of the liquid when at rest is a horizontal baffle plate secured within the tank with its peripheral edges spaced slightly inwardly from the opposing inner wall surfaces of the container. The baffle serves to retain the liquid in the lower portion of the container as the gas to be cleaned is driven therethrough and to serve as an impact wall against which the rapidly rising bubbles impinge.

The top of the container is covered with a cover plate, upon which is mounted a compressor or turbine blower. The inlet of the compressor receives the gas to be washed, which is then pumped at a very high velocity into the gas washing liquid through a drive pipe. The gas enters the liquid from the drive pipe near the bottom of the container, at substantially the horizontal center of the container. The gas then bubbles up through the gas washing liquid within the container. The dimensions of the container, the baffle plate, the high inlet gas velocity, as well as other factors to be discussed, are designed so as to circulate the gas through the liquid in a particular flow pattern such that the scrubbing action, including any chemical reactions necessary to convert the noxious gases to dissolvable constituents in the gas washing liquid, can be carried to completion with essentially total removal of the noxious components from the exiting gas stream. The cleansed gas escapes outwardly and upwardly around the marginal edges of the baffle into the upper portion of the container for subsequent discharge by means of an outlet stack mounted on the container cover.

The method of washing or deodorizing gases in accordance with the present invention includes providing a gas washing liquid in the bottom portion of a container, subjecting the gas to be washed to a sufficiently high velocity at the point of entry into the gas washing liquid to impart substantial kinetic energy to the gas-liquid system and form a mass of small gas-containing bubbles in the liquid, allowing the mass of small gas-containing bubbles to rise rapidly upwardly through the liquid into an impact plate which restrains the upper level of the gas-containing bubbles below the height the bubbles would assume if not restrained in order to establish a turbulent flow path for the gas bubbles through the liquid, and thereafter allowing the cleansed gas to escape from the liquid.

It is the principal object of this invention to provide a simple and inexpensive gas washing and purifying apparatus and method for cleansing objectionable and noxious gases from industrial waste gases, particularly gases which must undergo a chemical reaction before they can be readily scrubbed from an exhaust gas stream, such as DMEA, formaldehyde, phenols, and the like that are produced in the manufacture of foundry cores, arc welding operations, etc.

It is a further object of this invention to provide an apparatus for gas cleaning which may be readily constructed on a large scale and utilized to remove pollutants, or other undesirable products, from noxious gas streams prior to discharge of the gas stream into the atmosphere.

Another object of this invention is to provide a gas washing apparatus through which the gas to be cleansed may be pumped by a suitable gas pumping structure associated with the inlet of the drive pipe of the gas washing apparatus.

A further object of the present invention is to provide a method and apparatus whereby a gas stream is scrubbed of its noxious constituents in a washing liquid by driving the gas stream into the liquid at a very high velocity above a critical minimum velocity and below a critical maximum velocity.

Still another important object of this invention is to provide a gas washing apparatus and method having low power requirements.

A further object of this invention is to provide a gas washing apparatus in accordance with the preceding objects which will conform to conventional forms of manufacture, be of simple construction and easy to use so as to provide a device that will be economically feasible, long lasting and relatively trouble free in operation.

It is still further an object of this invention to provide a simple, reliable, and inexpensive apparatus and method for chemically reacting the noxious constituents of a gas stream by providing the energy needed to induce and carry out the chemical reaction from the kinetic energy of the gas caused by flowing the gas stream into a gas washing liquid at a very high velocity.

These together with other objects and advantages which will become subsequently apparent reside in the details of construction and method of operation as more fully hereinafter described and claimed.

DETAILED DESCRIPTION OF THE PREFERRED EMBODIMENTS OF THE INVENTION

Figure 1:
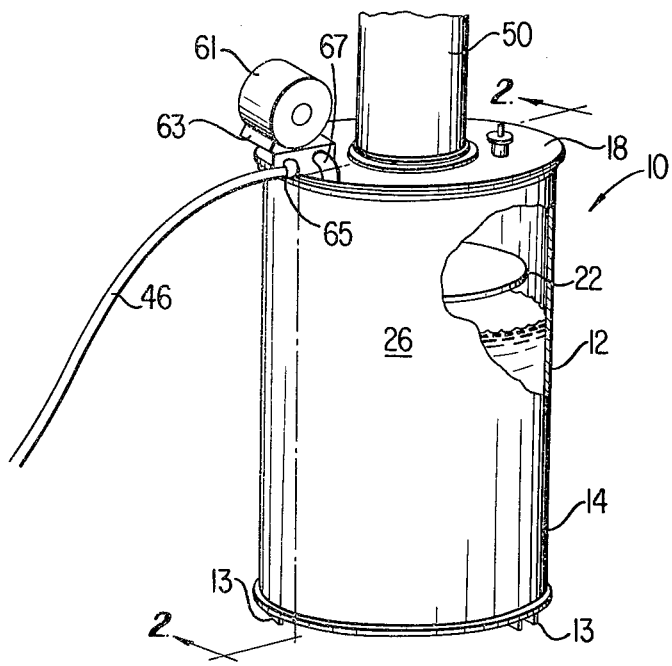
FIG. 1 is a perspective view of the gas welding apparatus of the present invention with a portion of the wall of the container component thereof being broken away and illustrated in vertical section.

Referring now more specifically to the drawings, wherein like numerals refer to like parts throughout, the numeral 10 generally designates the gas washing apparatus of the instant invention. The apparatus 10 includes an upstanding container or tank 12 preferably having a cylindrical side wall 14. A bottom wall 16 closes the lower end of the container 12 and a top cover wall or cover plate 18 closes the upper end of the container. Rubber gaskets (not shown) can be inserted between the top cover plate 18 and the container 12. The bottom wall 16 is supported by short legs 13 welded to the bottom of the container for easy movement and placement of the container.

The interior of the container 12 includes three circumferentially spaced mounting U-brackets 20 (only one shown in the drawings) supported from and projecting downwardly of top cover wall 18, and a horizontal baffle plate 22 supported from the brackets 20 by means of suitable fasteners, not shown. The baffle plate 22 in plan shape contours substantially to the shape of the horizontal cross-section of the container generally at the height where the baffle plate is positioned. However, the size of the baffle plate is slightly less than the horizontal cross-section so that the edge of the baffle plate is slightly spaced around its entire periphery from the adjacent portion of the side wall to allow for escape of the cleansed gas. In the preferred form as shown in the drawings, the container or tank 12 is cylindrical and the horizontal baffle plate 22 is circular with a diameter slightly less than the inside diameter of the container 12 whereby an annular gas flow space or opening 28 is provided between the baffle plate 22 and the opposing inner wall surface of the side wall 14. While the width of the annular opening 28 may vary, it has been found that a width of about ½-2 inches is preferrable. The baffle plate 22 has an opening 23 at its marginal portion through which a drive pipe 30 is fitted. The baffle plate 22, container 12, and top cover wall 18 are constructed of suitable corrosion-resistant and durable material, such as stainless steel or the like.

The central portion of the top cover wall 18 has a large diameter opening 48 formed therethrough and the inlet end of an outlet duct or stack 50 is secured by bolts (not shown) about the opening 48. Rubber gaskets (not shown) can be inserted between the cover plate 18 and the stack 50. The outlet stack 50 is preferably formed from a polyvinyl chloride (PVC) plastic tube. The stack diameter is sufficiently wide to reduce the gas exit flow velocity and to eliminate any pressure buildup that may occur. The stack is of a sufficient height so as to promote condensation and to eliminate any safety problems relating to splashing of the liquid in the container. The top wall 18 further has an inlet filler pipe 51 for communication with the interior of the container. A removable filler cap 53 is provided to seal the interior during operation. Chemicals can be added to the container through the filler pipe 51 as needed during operation of the unit.

On the top cover wall 18 of the container 12 is a vortex turbine blower 61 mounted on a mounting plate 63. The capacity of the blower 61 will depend upon the design requirements for a particular operation. A Type VB-022C vortex blower manufactured by the Spencer Turbine Company of Windsor, Connecticut, has been found to be a suitably designed blower for the instant invention. The blower 61 has a turbine inlet port 65 and a turbine outlet port 67. The inlet port is connected to a nose or pipe 46 which receives the gas to be washed. The outlet port 67 is connected to drive pipe 30 by means of an elbow shaped section 69.

Figure 2:
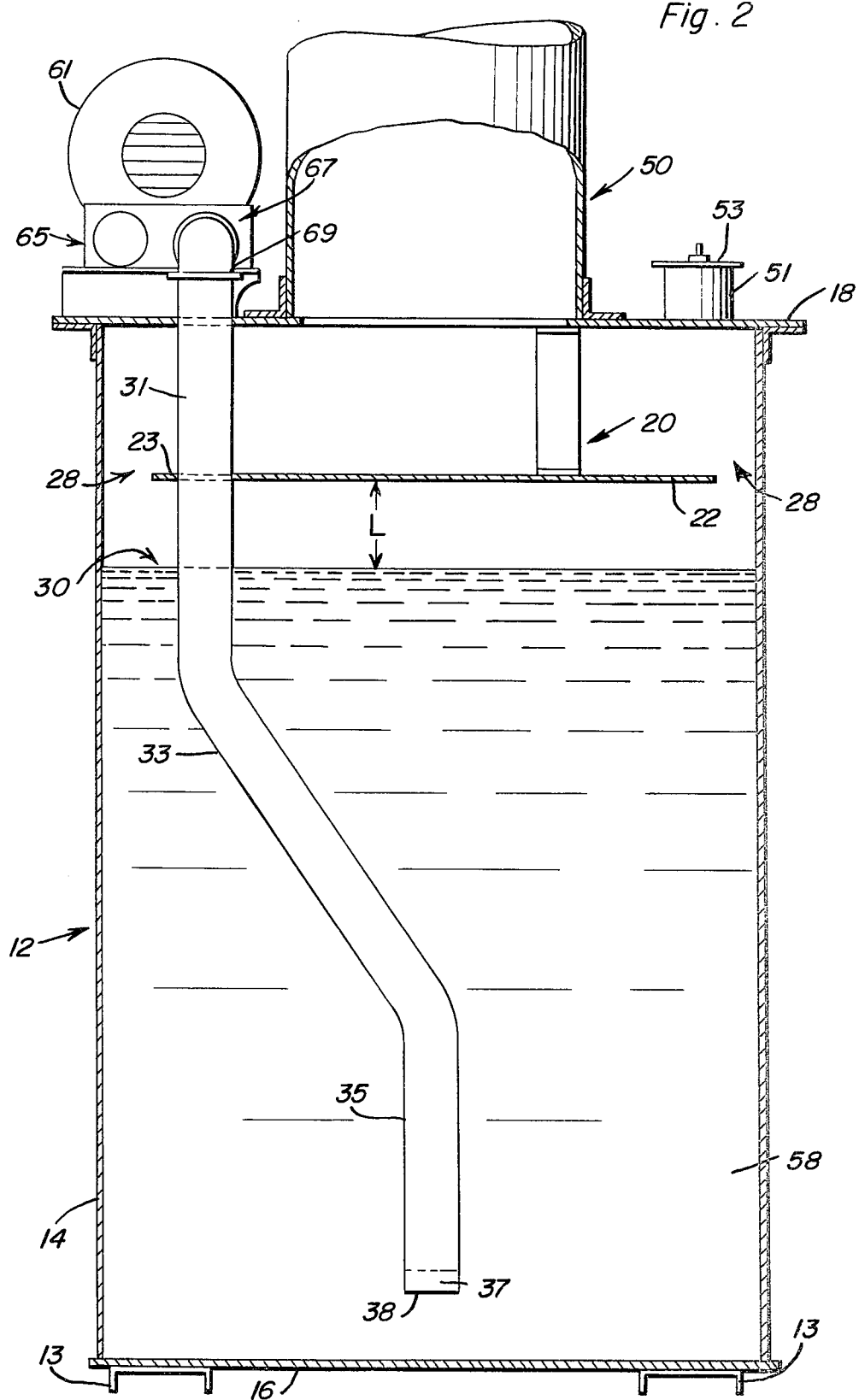
FIG. 2 is an enlarged vertical, sectional view taken substantially upon the plane indicated by the section line 2—2 of FIG. 1.
Figure 3:
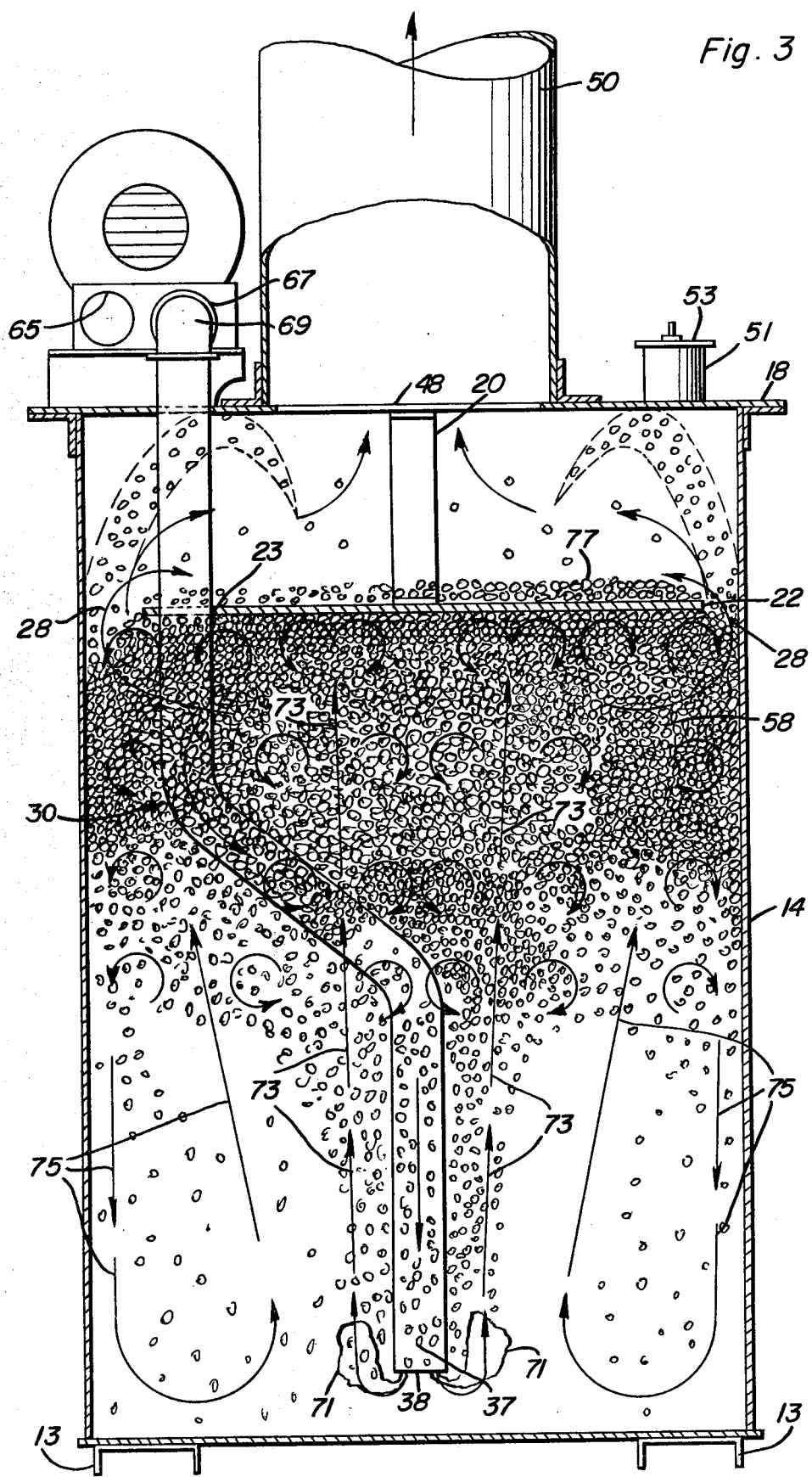
FIG. 3 is an enlarged vertical, sectional view taken substantially upon the plane indicated by the section line 2—2 of FIG. 1, and showing the bubbling and circulation pattern of the gas in the gas washing liquid in conformance with the method and apparatus of the present invention.

The drive pipe 30 extends through a hole in the top cover wall 18, through the opening 23 in the baffle plate 22, and into the lower portion of the container. The drive pipe 30 is depicted in FIGS. 2 and 3 as a pipe having a downward portion 31 parallel to the major axis of the container, a portion 33 approximately at a 45° angle from the vertical, and a further downward portion 35 substantially coaxial with the major axis of the container. The exact shape of the pipe 30 is not critical, although cylindrical pipe is convenient and therefore preferred, so long as the bends in the pipe are such that the high-velocity flow of gas through the pipe is not unduly impaired or constricted and the outlet portion 37 is located substantially along the major axis of the container (where only one drive pipe is utilized) and spaced slightly above the bottom wall 16. The outlet portion 37 projects downwardly with its outward opening 38 facing the bottom wall 16 of the container, to produce the desired circulation of the gas in the gas washing liquid. For large capacity units, having large diameters, a plurality of drive pipes may be used as needed.

The gas washing liquid 58 is comprised of a solution, normally water and including any necessary chemicals, adapted to wash and cleanse the particular gas being treated. The solution can encompass a wide range of chemicals, depending on the gases of particulate to be scrubbed. However, the present invention has been found particularly applicable to the scrubbing of gas streams containing amine pollutants, especially DMEA gas exiting from foundry core and mold manufacturing operations using the chemical or cold box process, such as the ISOCURE process of Ashland Chemical Company of Dublin, Oklahoma. In addition, the apparatus and method of the present invention has been found particularly successful in washing and scrubbing heretofore untreated exhaust gas streams generated in the "exothermic" or "hot" process for making conventional foundry cores and shell sand cores, where the principal pollutants are formaldehyde and phenol and in arc welding operations, where the principal pollutants of the waste gases are nitrogen oxides and carbon monoxide. In the removal of these pollutants from the foregoing gas streams, a 10% by volume blended acidic solution (acid in water), having a pH below 7 and preferably below 5, made by combining and diluting 85% phosphoric acid and 96% sulfuric acid (66° Baume), has been found most satisfactory. Acid can be periodically added through the filler pipe 51 to maintain the desired pH level. One particular acid combination solution found useful in the present invention is 70 parts $H_3PO_4$ and 30 parts $H_2SO_4$ by volume diluted with water to 10% acid by volume. Solutions found useful for treating DMEA gases, are a 10% phosphoric acid solution as well as "K-C Phosphoric Acid 85% Blend" sold by K. C. Cores, Inc. of Joliet, Illinois. However, it will be understood and appreciated by those skilled in the art that the precise chemical make-up and concentration of the gas washing liquid is not critical since various known chemicals in varying concentrations can be employed in treating a particular gas stream to convert the noxious constituent(s), as needed, to a soluble form for ready scrubbing by the aqueous liquid. It is only necessary that a sufficient quantity of the necessary chemical(s) be present in the liquid to achieve the desired reaction(s).

The bottom of baffle plate 22 and the top or liquid level of liquid 58 when in an at rest or non-operating condition are spaced apart a distance L, as shown in FIG. 2. The distance L will vary depending on the gas being treated in any particular unit, but is preferably 4 inches and normally should be anywhere from 5% to 20% of the total height of the at rest liquid in the container.

Figure 6:
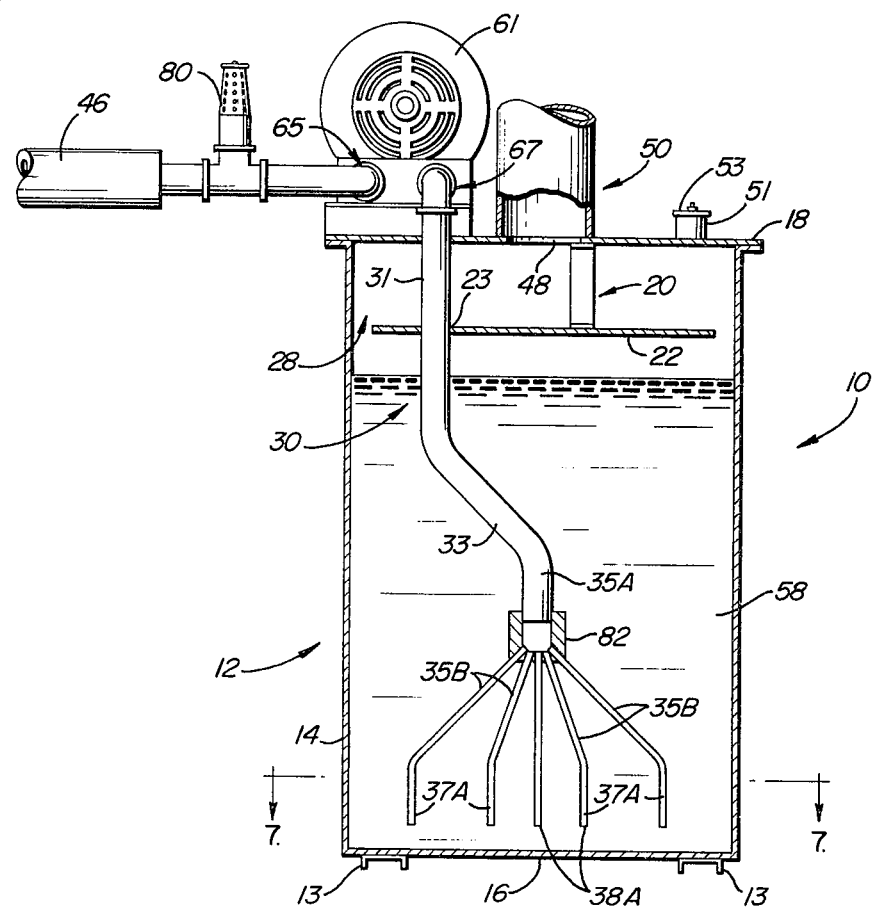
FIG. 6 is a vertical, sectional view of another embodiment of the gas washing apparatus of the present invention.

In operation, the gas to be treated is supplied by means of a pipe or hose 46 and is compressed and blown at a high velocity by the vortex blower 61 through the drive pipe 30. In almost all operations, the gas stream to be cleansed does not have sufficient volume to permit acceleration of the gases above the critical minimum velocity at the exit of the drive pipe required for the present invention. Also, where oxygen is needed to carry out the desired chemical reaction(s), it is necessary to dilute the exhaust gas stream with a major quantity of air. Therefore, in practically all operations, it is desired to introduce air into the gas stream in sufficient quantities to assure the necessary gas volume for attaining the required gas exit velocity at the drive pipe outlet and sufficient oxygen to allow for any oxidation reactions to proceed without interruption. Air can be introduced into the gas stream by any convenient means, such as a conventional check or other valve 80 in the inlet hose 46 as shown in FIG. 6. Another technique is to mount a separate blower on cover 18 whose inlet is open to the atmosphere. The outlet is connected to the drive pipe 30 in parallel with the first blower. By continuously operating the second blower at a speed above that necessary to assure an exit gas velocity above the critical minimum, an exit gas velocity above the minimum is always assured at the drive pipe outlet regardless of a temporary change in the exhaust gas supply through the first blower. Preferably, the second blower is connected to the drive pipe 30 by suitable piping outside the container to connect with elbow section 69.

If additional oxygen is required for the desired chemical reaction(s), an auxiliary hose line (not shown) can also be provided to an oxygen source such as a compressed oxygen container.

The gas stream entering the drive pipe is expelled from the bottom of the pipe 38 at the center of the cylindrical housing 12 slightly above the bottom plate 16. The very high velocity and flow rate of the gas stream are such that very small homogeneous bubbles on the order of $\frac{1}{8}-\frac{3}{8}$ inches in diameter will form in the gas washing liquid thus greatly increasing the reactive surface area of the gas in the liquid. The gas then bubbles through the gas washing liquid in a particular flow pattern as shown in FIG. 3.

The flow pattern of the gas through the liquid, as indicated generally in FIG. 3, creates rather large bubbles 71 at the point where the gas is expelled from the pipe due to the high impact of the gas into the liquid. These large bubbles rapidly disperse to form the smaller discreet bubbles which move upward rapidly from the bottom portion of the container at a slight angle from the major axis of the container, as shown by arrows 73. The bubbles move in the direction of arrows 73 as they approach the baffle plate 22. There, the baffle plate 22 acts as a retaining wall and serves as an impact wall against which the rapidly rising gas-containing bubbles impinge for tubulent contact. Then, after initial impingement against the baffle plate, and in conjunction with the annular opening 28, the gas is directed toward the sides of the container 14. That is, as the gas bubbles impact the baffle plate 22, the gas tends to flow outwardly toward the annular openings 28. As the bubbles approach the sides of the container 14, near the annular opening 28, a small portion of the gas is diverted outwardly on top of the plate 22, while other gas is circulated downwardly toward the bottom of the container and back upwardly again as shown by arrows 75. The dimensions of the container 12, the velocity of the gas flow at the outlet 37, and the contents of the washing liquid can be varied depending upon the characteristics of the gas to be cleansed.

The exit velocity of the gas stream at the opening 38 of the drive pipe 30 must be such that the gas particles are subjected to a sufficiently high velocity to provide the necessary kinetic energy to create the needed turbulence for the scrubbing action to be effective and to cause the chemical reaction, if desired, between the gas and the liquid to occur. It has been found that an exit gas velocity of at least 2300 linear feet per minute at the drive pipe outlet is required in order for the gas to attain the necessary kinetic energy. On the other hand, the velocity should not be so great as to cause the washing liquid to "blow out" of the container portion below the baffle, or force the gas to flow through the solution so quickly that the chemical reaction cannot be completed. The maximum velocity is related to and should not exceed that velocity which completely fills the container with gas-filled bubbles. It is believed that exit velocities in excess of 20,000 linear feet per minute for the gas stream would be unacceptable for the present invention. It has been found, however, that depending upon the size and capacity of the cleansing unit, a gas exit velocity between 4200 and 8400 linear feet per minute is preferred.

When operating the method of this invention within the exit gas velocity parameters described in the preceding paragraph, it has been noted that the gas-containing bubbles move in the washing liquid of the preferred apparatus of this invention according to the flow path shown in FIG. 3. Yet, when the gas exit velocity approaches and drops below the aforesaid 2300 lin. ft/min critical minimum, the gas bubble flow pattern changes radically. Instead of forming small discreet gas-containing bubbles which move upwardly around the drive pipe to impact against the baffle 22, the gas exiting from the drive pipe forms into large bubbles which generally remain in tact all the way up through the washing liquid until contacting the baffle 22. Thus, the believed beneficial results from having small, discreet gas-containing bubbles impact the baffle is lost as the gas exit velocity approaches and drops below 2300 lin. ft/min. Therefore, without intending to be limited to this theory, it is presently believed that in order to achieve the beneficial results attendant the present invention, the gas exit velocity at the drive pipe outlet must be sufficiently high to achieve a gas-containing bubble flow pattern through the washing liquid as shown in FIG. 3.

Figure 5:
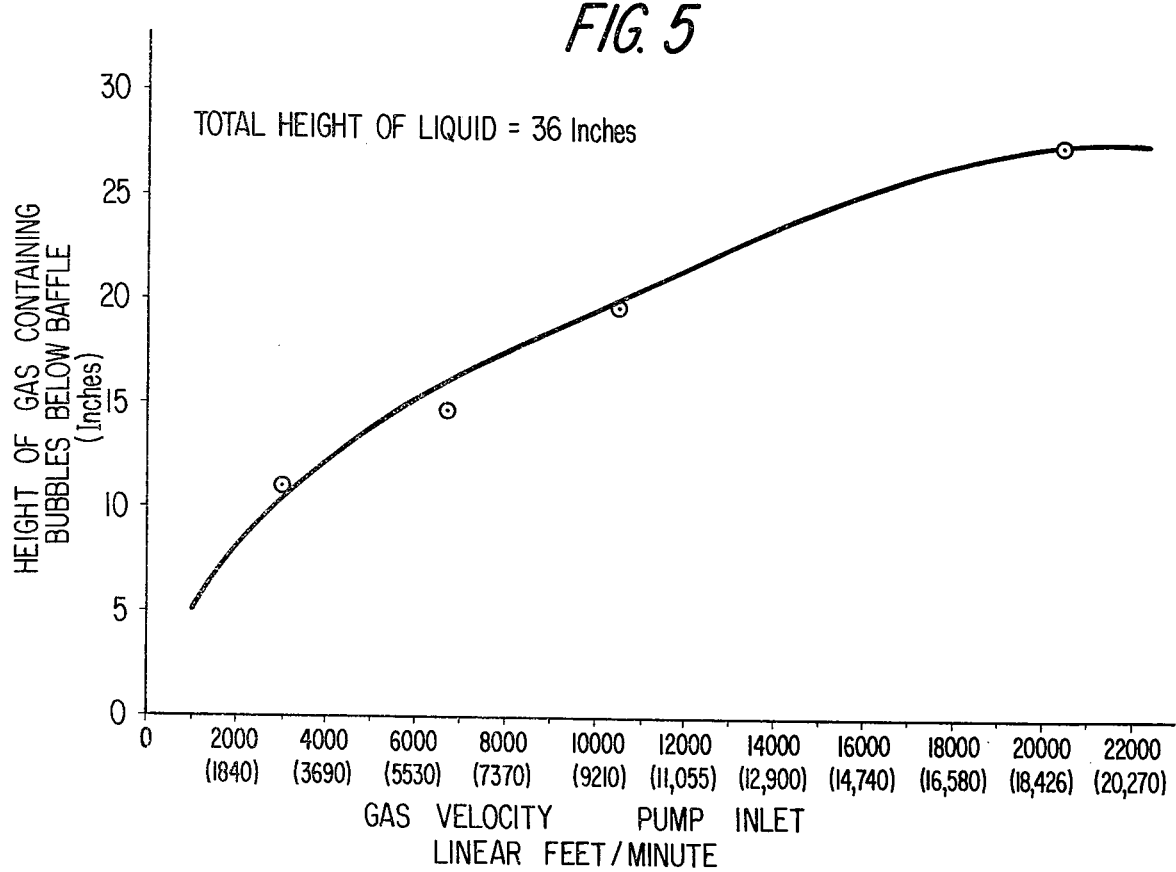
FIG. 5 is a graph illustrating the relationship in accordance with the present invention of the gas inlet velocity and height of gas-carrying bubbles in the washing liquid.

Turning to FIG. 5, the linear velocity of the gas stream entering the blower (which is proportional to the linear velocity at the drive pipe outlet as discussed hereinafter) has been plotted against the height of the bubbles in the washing liquid. It will be noted that within the prescribed limits of the invention, the height of the bubbles in the washing liquid is directly proportional to gas velocity. As you approach and surpass the critical maximum 20,000 lin. ft/min, the curve then flattens out and is no longer proportional. Within the operative range for the exit gas velocity the height of the bubbles within the liquid is 30–75% of the height of the liquid in an at rest state.

As shown in FIG. 3, even when operating within the preferred gas exit velocity range, some of the gas-containing bubbles do rise over the baffle plate, as shown at 77. The liquid component of these bubbles will roll back down into the container, while only a very small proportion of the liquid will be diverted out to the outlet stack 50 with the gas. The gas, escaping around baffle 22, which has now been cleansed, is directed from the container through the outlet stack 50. The outlet stack 50 is of a sufficient height so that condensation occurs in the outlet stack and the condensed liquid will fall back into the container. If desired, a fibrous filter, such as the typical home furnace filter, may be inserted at the top of the outlet stack to capture any residual particulate and moisture in the exiting gas stream.

As will be apparent to those of ordinary skill in this art, the interaction between the gas to be cleansed and the liquid in the container can vary, depending upon the results desired. For example, in some cases a chemical reaction will occur, while in other cases only a scrubbing occurs whereby undesirable gases and particulates are scrubbed from the gas stream without chemical conversion.

We shall now describe our invention as applied to the washing and scrubbing of particular exhaust gas streams utilizing specific embodiments of the invention. As stated previously, this invention is particularly suited to scrubbing the dimethylethylamine (DMEA) gases generated in what is known in the foundry industry as the "chemical" or "cold box" process for making foundry cores or molds. One such process is known as the ISOCURE process referred to previously. Briefly, the core ingredients of sand and a small guantity of a binder, approximately 1.5% by weight of the sand, such as about equal parts isocyanate and polyurethane, are mixed and placed into a form. A DMEA gas stream, normally containing 12% DMEA and the balance air or $CO_2$ is then passed through the form for 5–10 seconds followed by a 10–20 second air purge to cure the core. Heretofore, this DMEA exit gas was passed directly to the atmosphere and efforts to scrub the DMEA gas at reasonable cost were characteristically unsuccessful.

One such chemical or cold foundry core making apparatus was equipped with the present invention as shown in the preferred embodiment. The foundry core making apparatus used about 2.25 pounds of DMEA gas (actual DMEA) per hour. Sufficient air was introduced into the gas stream to produce a gas stream of 74.2 parts oxygen to one part DMEA. The blower was a Spencer vortex side channel blower having a rated horsepower of 3.7 hp. The inlet port and outlet port diameters were 2 inches. The cylindrical container had a diameter of 30.5 inches and a height of 48 inches. One hundred ten gallons of a gas washing liquid were added to the container, resulting in a liquid height of approximately 36 inches from the bottom of the container. The liquid comprised a 10% phosphoric acid solution. The drive pipe interconnecting the blower with the interior of the container had a two inch inner diameter and its outlet was positioned three inches from the bottom of the container. The drive pipe outlet was positioned so as to expel the gas to be processed downwardly toward the container bottom wall. The static pressure in the pipe had been calculated to be approximately 1.5 to 2.5 psi due to the head of the liquid solution in the container. The liquid level of the washing acid was such that the baffle plate was 4 inches above the top of the liquid when at rest, and the liquid height above the drive pipe outlet was approximately 33 inches. The outlet stack had a 14 inch diameter to reduce the exit flow velocity and any pressure build-up that may have occured in the system. The gas was rapidly drawn in and accelerated by the blower 61 through the drive pipe 30. The velocity of the gas at the inlet to the blower was measured with an anomometer to be 7400 linear feet per minute (drive pipe exit velocity of approximately 6800 lin. ft/min).

The accelerated gas entering the acidic liquid solution had a high enough velocity to ensure that its kinetic energy was greater than the threshold energy needed for the reaction to occur. It was noted that the bubbles resulting from this impact velocity had an average diameter of approximately ¼ inch and each bubble has been calculated to have remained in the solution for an average of approximately 1.5–5.4 seconds. The reaction occurring in the container was as follows:

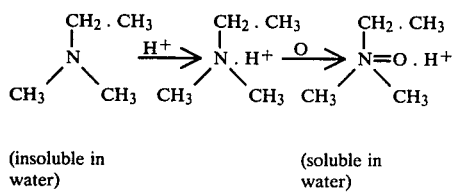

(insoluble in water)   (soluble in water)

Some of the product will stay as amino oxides, and some will go to phosphate salts and carbon dioxide. The gas stream exiting from the foregoing described apparatus showed the following analysis:

| pH of vapors | 6.9 |
|---|---|
| NH₃ | 0.001 ppm |
| formaldehyde | none |
| phenol | none |
| CO | none |
| CN | none |
| CO₂ | traces-but not a pollutant |
| P (phosphorus in any form) | 1.75 ppm |
| amine derivatives | only traces, but no odor |
| dimethylethylamine | less than .1ppm (below odor threshold) |
| balance | water vapor |

During the operation of the foregoing system, if the velocity of the gas stream is too slow or the oxygen intake is too low, then the reaction of the gas washing acid and oxygen with the noxious components of the gas does not go to completion and a syrupy chemical is produced which thickens the washing acid into a gelatinous constituency. In contrast, if too great a volume of gas is fed through the system or the acid concentration drops too low the gas will produce a gray precipitate of aminophosphate. Thus, it is necessary to recharge the washing acid periodically, say, one quart of undiluted acid each eight hours of operation. A drive pipe exit gas velocity of about 5100–7900 linear feet per minute is preferred for normal operation of a system of this size.

We have found that it is not necessary to completely replace the washing acid in this system except once every three months and in some cases possibly not until after one year of operation. In view of the importance of the oxygen component in the gas stream for scrubbing the DMEA, the volume of oxygen present must be at least twice the volume of DMEA to be scrubbed. Further, as an alternate to periodic addition of chemicals to the washing liquid, the apparatus can be equipped with a feeding mechanism to slowly add chemicals to the system on a continuous basis.

As an alternative to the 10% phosphoric acid solution for the gas washing liquid, equally satisfactory acid solutions could be any dilute phosphoric acids up to 10% as well as dilute acid blends of phosphoric acid and sulphuric acid. Other acid formulations could also be equally satisfactory.

In the design of our invented apparatus, we prefer a 2 inch i.d. drive pipe, but of course different sizes can be readily adapted depending upon the overall size of the equipment to be employed. With a 2 inch i.d. drive pipe, we have found that the diameter of the container must be at least 2 feet ±10% to ensure at least 1 foot ±10% unobstructed washing liquid around the drive pipe outlet. Therefore, in larger units using multiple 2 inch i.d. drive pipes, adjacent drive pipes should be at least 2 feet ±10% apart, center to center, and each drive pipe should be at least one foot away from the closet portion of the container wall. In addition, with the preferred 2 inch i.d. drive pipe, there must be at least one foot of liquid head in the container above the drive pipe opening and preferrably 2–4 feet, and more if multiple drive pipes are employed. In other words, using a 2 inch i.d. drive pipe, the at rest liquid level of the washing liquid in the container must be at least one foot, and preferably two to four feet above the drive pipe opening using a single drive pipe.

When using the preferred 2 inch i.d. drive pipe, the velocity range of 2300 to 20,000 linear feet per minute corresponds to a flow rate of about 54 to 440 cubic feet per minute. The preferred velocity range of 4200 to 8400 linear feet per minute corresponds to a flow rate of about 92–184 cubic feet per minute.

Figure 7:
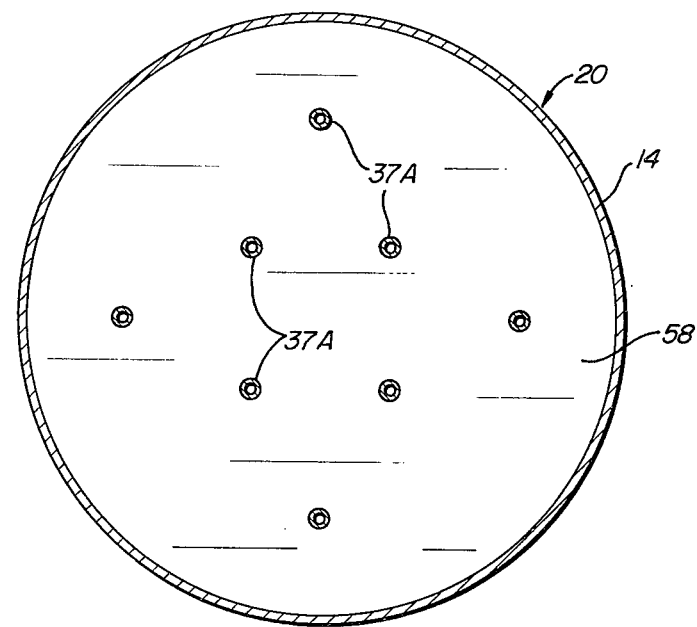
FIG. 7 is an enlarged horizontal, sectional view taken substantially along the plane indicated by the section line 7—7 of FIG. 6.

A larger unit using multiple 2 inch i.d. drive pipes is illustrated in FIGS. 6 and 7. The drive pipe 30 has a downward portion 31 parallel to the major axis of the container, a portion 33 approximately at a 45° angle from the vertical, and a further downward portion 35A substantially coaxial with the major axis of the container. The downward portion 35A branches at distribution boot 82 into a plurality (i.e., eight) of downward portions 35B. The outlet portions 37A of the plurality of downward portions 35B are spaced slightly above the bottom wall 16. The outlet portions 37A project downwardly with their outlet openings 38A facing the bottom wall 16 of the container. The outlet portions 37A are vertically positioned within the container so as to be spaced from the closest portion of the side wall 14 and the adjacent outlet portions 37A a distance of at least approximately one foot.

Based upon the observations and analyses of the DMEA gas processing operation as above described the following design parameters would prevail in designing other units of different sizes:

CFM (cubic feet per minute) of gas flow to be treated:

cubic ft. of gas washing liquid = $0.091 \times$ CFM:

gallons of gas washing liquid = $0.091 \times CFM \times 7.48$:

$$\text{diameter of container} = 2\sqrt[3]{\frac{\text{cu. ft. of soln.}}{7.54}}:$$

height of solution = $2.4 \times r$ (radius of container):
height of container = $1.3 \times$ ht. of sol.:

$$\text{diameter of stack} = 2\sqrt{\frac{CFM}{473}}:$$

diameter and number of $$\text{drive pipes} = D = 12\sqrt{\frac{4Q}{N\pi(7400)}}:$$

(N = number of drive pipes)
(Q = flow rate in CFM)

Turbine(s) size to meet CFM requirements:

In considering the above design parameters and, in particular, the 0.091 multiple factor for determining the needed cubic feet of gas washing liquid, those skilled in the art will readily appreciate that variations can be tolerated. In fact so long as the multiple factor is kept within the range 0.067–0.27 the volume of gas washing liquid should be satisfactory to accomplish the desired scrubbing.

Figure 4:
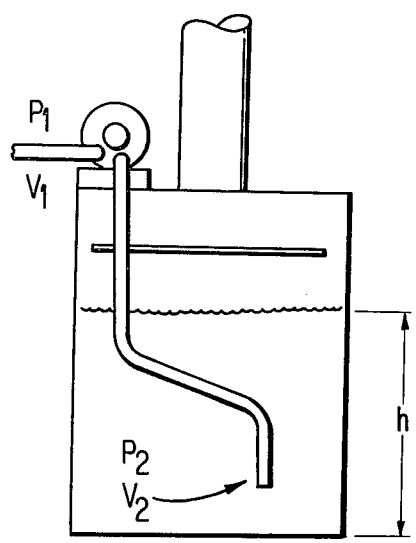
FIG. 4 is a schematic rendering of the apparatus, used for calculating velocity at the outlet of the drive pipe.

The foregoing drive pipe exit velocities and above ratios have all been calculated using the turbine inlet velocity because it is the velocity most readily capable of measurement. The velocity of the gas impacting the liquid from the outlet of the drive pipe at the bottom of the container, which is the critical parameter, is extremely difficult to measure accurately and therefore only approximate impact velocities have been calculated according to the following analysis. Referring to the schematic rendering in FIG. 4, the following calculations were undertaken:

$P_1$ = atmospheric pressure
$P_2$ = total pressure in pipe
$P_3$ = pressure due to solution head
$P_2 = P_1 + P_3$
$P_1 = 14.4$ psia locally $P_3$ = liquid head × spec. grav. of sol. × 0.03613
(where 0.03613 is conversion factor inches of water to psi)
= 32 in. × 1.068 × 0.03613
= 1.23 psi $P_2 = 14.4 + 1.23 = 15.63$ psi Based upon the foregoing, the approximate impact velocity $V_2$ can be calculated from the measured pump inlet velocity $V_1$ by the following formula:

$$V_2 = \frac{14.4}{15.63} V_1$$

It should be apparent that other size containers can be used. The inlet velocity will vary depending upon the container size, and the amount of liquid solution in the container. For example, using a tank having a diameter of 24 inches and a height of 36 inches, 50 gallons of solution are placed inside the container and the preferred blower inlet velocity is 4200 linear ft/min which is equivalent to a drive pipe exit velocity of about 3860 linear ft/min. Using a container having a diameter of 38 inches and a height of 48 inches, 180 gallons of liquid are placed in the container and the preferred blower inlet velocity is 8400 linear ft/min, or a drive pipe exit velocity of about 7730 linear ft/min. In the latter system, two drive pipes could be used which would require a blower inlet velocity of at least approximately 5600 linear ft/min for each blower.

In another embodiment of our invention, an apparatus substantially identical to that described for scrubbing the DMEA foundry core exhaust gases was assembled adjacent to a batch core oven for curing conventional foundry cores. In this core-making process, about 30 parts sand are mixed with about 5 parts of a conventional phenolic resin and 65 parts of a standard exothermic sand core composite. After formed, the core is baked at 400°–500° F. sufficient to set the resin. As a result, gases containing as much as 1% formaldehyde and 4% phenols are generated. Following treatment with the apparatus and method of the present invention using a 10% by volume acid concentration of 70 parts phosphoric acid (85%) and 30 parts sulphuric acid (92–96%) by volume, the exhaust gas stream exiting to the atmosphere had the following analysis of potential pollutants:

| | |
|---|---|
| $NH_3$ | none |
| Amines | none |
| $H_2S$ (S from natural gas) & $SO_2$ | none |
| CO | none |
| phenols | none |
| P | none |
| formaldehyde | none |
| pH of vapors | 6.9 |
| balance | water vapor |

In a further embodiment of the invention, an apparatus substantially identical to that described for scrubbing the DMEA foundry core exhaust gases was used to wash and scrub the noxious gases generated in an arc welding operation. The gas washing liquid was a 10% solution (by vol.) of an acid component comprising 70 parts $H_3PO_4$ (85% conc.) and 30 parts $H_2SO_4$ (92–96% conc.) by volume and potassium permanganate in an amount equal to 5% by weight of the acid components. An analysis of the arc welding exhaust gases entering the apparatus of our invention (measured at the weld) and an analysis of the gas stream as it exits was as follows:

| | Before Unit | After Unit |
|---|---|---|
| nitrogen oxides | traces | none |
| CO | 5000ppm | 50ppm |
| dextrin (binder) | none | none |
| Mn (particulate) | 30ppm | none |
| Fe (particulate) | 270ppm | 108ppm |
| Cr (particulate) | trace | none |
| phenolic compounds (used as binders) | some present | none |
| balance | water vapor | water vapor |

While the present invention has been described primarily with respect to exhaust gases from foundry core manufacturing processes and arc welding operations, it will be understood that the apparatus and method of this invention can be readily adapted by those skilled in the art to any number of industrial processes generating polluting exhaust gases and especially to those noxious gases which lend themselves to chemical conversion in order that they can be scrubbed from the gas stream. Hence, numerous applications for the present invention will readily occur to those skilled in the art as well as numerous modifications without departing from the scope of the invention.

For example, the dimensions of the drive pipe might vary along its length and one or more reservoirs might be employed therein for entrapping specific noxious components. Further, a high voltage electrode could be added near the entrance of the drive pipe into the container which ionizes the incoming gases to promote a faster reaction, or chemicals or other catalysts might be added in order to promote the necessary chemical reactions. Monitoring devices such as pH meters and vacuum gauges can also be used with the invention. In addition, the present invention contemplates use of the units in series to treat the gas stream with different chemicals in the washing liquid of each unit to separately scrub the various noxious components.

In view of the numerous applications for this invention and the modifications which will occur to those skilled in the art without departing from the spirit of the invention, it is intended that the invention be limited only by the scope of the appended claims.

What is claimed is:

1. A gas process apparatus to scrub noxious gas from a gas stream which comprises:
   (a) a closed upstanding container having a substantially flat bottom, a side wall, and a top cover;
   (b) a gas washing liquid disposed in said container to a predetermined level;
   (c) a baffle plate mounted substantially horizontally in said container above said predetermined liquid level and being spaced from said side wall of said container about at least substantially the entire periphery of said baffle plate to permit cleansed gas to escape, the space between said baffle plate and said gas washing liquid being substantially unobstructed, said baffle plate having a substantially flat surface facing said liquid and having a size and shape to retain liquid in the lower portion of said container as gas is driven therethrough and to act as an impact wall against which gas-containing bubbles impinge;
   (d) at least one drive pipe having an inlet positioned outside of said container and extending into said container with an outlet positioned substantially vertically near the bottom of said container appreciably below said predetermined liquid level to direct a high velocity gas stream passing therethrough substantially vertically into the bottom of said container;
   (e) pumping means for receiving and pumping a gas to be processed into the inlet of said drive pipe to form gas-containing bubbles in said gas washing liquid;
   (f) an outlet stack having a diameter greater than the outlet diameter of said drive pipe, said outlet stack communicating with the interior of said container above said baffle plate, said outlet stack serving to discharge cleansed gas escaping around the periphery of said baffle plate from said container; and
   (g) said baffle plate being spaced above said predetermined liquid level a distance sufficient to cause said gas-containing bubbles to recirculate through said liquid before passing outwardly around the periphery of said baffle plate.

2. The apparatus of claim 1 wherein said pumping means comprises a turbine pump having an inlet port and an outlet port, said inlet port adapted to receive the gas to be processed, and said outlet port interconnected with said drive pipe inlet.

3. The apparatus of claim 1 wherein said baffle plate is mounted closer to said top cover than to the bottom of said container and has a horizontal surface area smaller than the horizontal cross-sectional area of said container at the point of mounting.

4. The apparatus of claim 1 wherein said container is in the shape of a cylinder having a circular bottom, a circular top cover, and a cylindrical side wall.

5. The apparatus of claim 3 wherein said baffle plate is circular and is mounted in concentric relation to said cylindrically shaped container to provide an annular opening between said cylindrical side wall and said baffle plate.

6. The apparatus of claim 3 wherein said annular opening is about 1-2 inches in width.

7. The apparatus of claim 1 wherein said inlet of said drive pipe is positioned adjacent to said top cover, said drive pipe extends through said top cover of said container and through an opening in said baffle plate near the outer peripheral portion of said baffle plate.

8. The apparatus of claim 2 wherein said drive pipe has a curved portion between said baffle plate and the bottom wall of said container.

9. The apparatus of claim 1 wherein said gas washing liquid comprises an acidic solution having a pH less than about 5.0.

10. The apparatus of claim 9 wherein said pumping means comprises means for pumping the gas to be processed into the inlet of said drive pipe at a sufficient velocity so as to cause a chemical reaction to occur between the gas to be processed and the gas washing liquid.

11. The apparatus of claim 1 wherein said drive pipe has an inner diameter on the order of 2 inches and is positioned vertically within said container so as to be spaced from the closest portion of said side wall and any adjacent drive pipe a distance of at least approximately six times the inner diameter of said drive pipe.

12. The apparatus of claim 1 wherein said baffle plate is mounted within said container by mounting brackets suspending said baffle plate from said top cover so as to be removable with said cover to open completely the interior of said container.

13. A gas processing apparatus to scrub the noxious gases exiting from the manufacture of foundry and shell sand cores by the hot or cold process which comprises:
   (a) a closed container having a substantially flat bottom, a side wall, and a top cover;
   (b) a gas washing acid disposed in said container to a predetermined level;
   (c) a baffle plate mounted substantially horizontally in said container above said liquid level with its peripheral portions spaced inwardly from adjacent portions of said side wall;
   (d) at least one drive pipe having an inlet positioned outside of said container and extending into said container and having an outlet positioned substantially vertically near the bottom of the gas washing acid so that gases passing through the drive pipe enter the bottom of said acid in a substantially vertical direction;
   (e) pumping means having an inlet for receiving said gas stream to be processed and pumping said gas stream into the inlet of said drive pipe;
   (f) an outlet stack mounted on and communicating with the interior of said container above said baffle plate through said cover;
   (g) means for introducing oxygen into said drive pipe to be passed, along with said gas stream to be processed, out of the outlet of said drive pipe into the gas washing acid for oxidative reaction; and
   (h) said baffle plate being spaced above said liquid level and the space between said baffle plate and said liquid level being substantially unobstructed whereby gas-containing bubbles moving upwardly through said gas washing acid will impact against the undersurface of said baffle plate and thereby cause a major portion of said gas to pass a plurality of times through said gas washing acid before passing outwardly from beneath the outer marginal portions of said baffle plate.

14. The apparatus of claim 13 wherein said means for introducing oxygen into said drive pipe comprises a second pumping means having an inlet for drawing in oxygen and an outlet in conduit communication with said drive pipe to pump the oxygen directly into said drive pipe to mix therein with said gas stream to be processed.

15. The apparatus of claim 13 wherein said gas washing acid is a dilute acid having a pH equal to or less than about 5.0 and selected from the group consisting of phosphoric acid and a combination of phosphoric acid and sulphuric acid.

16. The apparatus of claim 13 wherein said means for introducing oxygen comprises a valve means communicating with the inlet of said pumping means by which the oxygen can be drawn into the inlet of said pumping means and pumped along with said gas stream to be processed into the inlet of said drive pipe.

17. The apparatus of claim 16 wherein said valve means allows air to be drawn into the inlet of said pumping means.

18. A gas washing apparatus comprising a closed container, a gas washing liquid disposed in said container to a predetermined level, a horizontal baffle mounted in said container above said level and including spaced peripheral portions spaced inwardly of the opposing inner surfaces of said container, a gas inlet duct for said container opening into an upper portion of said container above said baffle and extending downwardly past the baffle and opening downwardly only in a central portion of the lower end of said container closely above the closed lower end thereof and appreciably below said level for high velocity discharge of gas from said duct downwardly into said liquid and against the inner surface of the closed lower end of said container, said container including a top wall, said baffle being spaced only slightly above said level a distance sufficient to cause gas bubbling upwardly through liquid to contact the undersurface of said baffle and to cause a major portion of said gas to pass several times through said liquid immediately beneath said baffle before passing outwardly from beneath the outer marginal portions of said baffle, an outlet duct of greater cross-sectional area than said inlet duct opening outwardly through a central portion of said top wall, said baffle being of a plan shape conforming to the horizontal cross-sectional shape of said container and substantially all of the marginal edges of said baffle being generally equally inwardly spaced from the opposing inner surfaces of said container, said inlet duct extending downwardly through one marginal portion of said baffle.

19. The apparatus of claim 18 including a plurality of support brackets spaced about and supported from the interior of said container, spaced peripheral portions of said baffle being secured to and supported from said brackets.

20. A gas processing apparatus to scrub noxious gas from a gas stream which comprises:
(a) a closed container having a bottom, a side wall, and a top cover adapted to contain a liquid;
(b) a gas washing liquid disposed within said container to a predetermined level;
(c) a baffle plate mounted substantially horizontally in said container above said liquid level having a substantially flat surface facing said liquid and having a horizontal surface area smaller than the horizontal cross-sectional area of said container at the point of mounting so that the outer periphery of said baffle is spaced from said side wall of said container, the space between said baffle and said liquid level being substantially unobstructed whereby gas-containing bubbles moving upwardly through said liquid will impact against the undersurface of said baffle;
(d) at least one drive pipe having an inlet positioned outside of said container and extending into said container with an outlet positioned substantially vertically near the bottom of said container below said liquid level a distance of at least approximately one foot to direct a gas stream passing therethrough substantially vertically into the bottom of said container, said at least one drive pipe being substantially vertically positioned within said container so as to be spaced from the closest portion of said side wall and any adjacent drive pipe a distance of at least approximately one foot;
(e) pumping means for receiving and pumping a gas to be processed at high velocity into the inlet of said drive pipe to form gas-containing bubbles in said gas washing liquid;
(f) an outlet stack having a diameter greater than the diameter of said drive pipe, said outlet stack communicating with the interior of said container above said baffle plate; and
(g) said baffle plate being spaced above said predetermined liquid level a distance sufficient to cause said gas-containing bubbles to recirculate through said liquid before passing outwardly around the periphery of said baffle plate.

21. A gas processing apparatus to scrub noxious gas from a gas stream which comprises:
(a) a closed upstanding container having a substantially smooth bottom, a side wall, and a top removable cover;
(b) a gas washing liquid disposed within said container to a predetermined level;
(c) a baffle plate mounted substantially horizontally in said container above said predetermined liquid level, said baffle plate having a substantially flat surface facing said liquid and a size slightly less than the horizontal cross section of said container so that the edge of said baffle plate is spaced around its entire periphery from the adjacent portion of said side wall to allow for escape of cleansed gas;
(d) at least one drive pipe having an inlet positioned outside of said container and extending into said container with an outlet positioned substantially vertically near the bottom of said container below said liquid level a distance of at least approximately one foot to direct a gas stream passing therethrough substantially vertically into the bottom of said container, said at least one drive pipe being spaced from the closest portion of said side wall and any adjacent drive pipe a distance of at least approximately one foot;
(e) pumping means for receiving and pumping a gas to be processed into the inlet of said drive pipe at a sufficient velocity and flow rate to form very small homogeneous bubbles on the order of $\frac{1}{8}$ to $\frac{3}{8}$ inch in diameter in said gas washing liquid;
(f) an outlet stack having a diameter greater than the diameter of said drive pipe and sufficiently large to reduce the gas exit velocity relative to the gas inlet velocity and to eliminate pressure buildup within said container, said outlet stack communicating with the interior of said container above said baffle plate; and
(g) said baffle plate being spaced above said liquid level from 5 to 20% of the total height of the at rest liquid in said container and the space between said baffle plate and said liquid level being substantially unobstructed, said spacing of said baffle plate above said liquid level being sufficient to cause gas-containing bubbles moving upwardly through said liquid to impact against the undersurface of said baffle plate and to cause a major portion of said gas to pass a plurality of times through said liquid before passing outwardly around said baffle plate.

* * * * *